United States Patent
Kim

(10) Patent No.: US 9,573,488 B2
(45) Date of Patent: Feb. 21, 2017

(54) DRIVING CONTROL METHOD AND SYSTEM OF FUEL CELL VEHICLE

(71) Applicant: Hyundai Motor Company, Seoul (KR)

(72) Inventor: Seon Hak Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/935,387

(22) Filed: Nov. 7, 2015

(65) Prior Publication Data

US 2017/0008420 A1    Jan. 12, 2017

(30) Foreign Application Priority Data

Jul. 7, 2015 (KR) .................. 10-2015-0096282

(51) Int. Cl.
| B60L 9/00 | (2006.01) |
| B60L 11/18 | (2006.01) |
| H01M 8/04 | (2016.01) |

(52) U.S. Cl.
CPC ........ *B60L 11/1892* (2013.01); *B60L 11/1887* (2013.01); *H01M 8/04029* (2013.01); *H01M 8/0488* (2013.01); *H01M 8/04302* (2016.02); *H01M 8/04365* (2013.01); *H01M 8/04559* (2013.01); *H01M 8/04723* (2013.01); *H01M 8/04731* (2013.01); *H01M 8/04753* (2013.01); *H01M 8/1007* (2016.02); *B60L 11/1881* (2013.01); *B60L 2240/36* (2013.01); *H01M 2250/20* (2013.01)

(58) Field of Classification Search
CPC ............. B60L 11/1892; B60L 11/1888; B60L 11/1881; H01M 8/04365; H01M 8/04731; H01M 2250/20; H01M 8/04619; Y02T 90/32
USPC ............... 701/22, 36; 180/65.265; 429/436
See application file for complete search history.

(56) References Cited

U.S. PATENT DOCUMENTS

| 6,846,586 B2 * | 1/2005 | Aramaki .......... B60L 11/1881 429/410 |
| 7,887,965 B2 * | 2/2011 | Kobayashi ....... H01M 8/04007 429/413 |

FOREIGN PATENT DOCUMENTS

| JP | 2006-294458 A | 10/2006 |
| JP | 2007-305412 A | 11/2007 |
| JP | 2009-283210 A | 12/2009 |
| KR | 10-1000703 | 12/2010 |

* cited by examiner

*Primary Examiner* — Gertrude Arthur Jeanglaud
(74) *Attorney, Agent, or Firm* — Mintz Levin Cohn Ferris Glovsky and Popeo, P.C.; Peter F. Corless

(57) ABSTRACT

A driving control method and system for a fuel cell vehicle are provided. The driving control method includes monitoring, by a vehicle controller, information regarding vehicle conditions and entering a minimum driving mode when the monitored vehicle conditions meet minimum-driving-mode entry conditions. A temperature of a fuel cell stack detected and then adjusted when the determined temperature of the fuel cell stack is different from a preset target stack temperature value, to match the temperature of the fuel cell stack with the preset target stack temperature.

20 Claims, 2 Drawing Sheets

DRIVING CONTROL METHOD AND SYSTEM OF FUEL CELL VEHICLE

CROSS REFERENCE TO RELATED APPLICATION

The present application claims priority to Korean Patent Application No. 10-2015-0096282, filed Jul. 7, 2015, the entire contents of which is incorporated herein for all purposes by this reference.

BACKGROUND

Field of the Invention

The present invention relates to a driving control method and system for fuel cell vehicles control a minimum driving mode of a fuel cell vehicle and minimum-driving-mode entry and release conditions to improve the durability and drivability of the vehicle.

Description of the Related Art

A fuel cell is a power generation device that converts chemical energy of fuel into electric energy by an electrochemical reaction in a fuel cell stack rather than converting the chemical energy into heat by combustion. Such a fuel cell can be applied to the supply of electric power for small-sized electrical/electronic devices such as portable devices, as well as to the supply of electric power for industrial use, home use or driving vehicles. Recently, research has been conducted regarding fuel cell vehicles operated using energy generated by the combination of hydrogen and oxygen. Particularly, research has been conducted regarding an idle stop function, which interrupts generation of a fuel cell as required during the operation of a fuel cell vehicle to enhance the fuel efficiency of the vehicle and then restart the fuel cell.

Further, there is a difference between the idle stop function and shutting down the fuel cell system after the operation of the vehicle has been completed. Thus, a control process for idle stop of the fuel cell is also differentiated from a control process for shutting down the system. Accordingly, various control methods for such an idle stop function have been proposed. As a representative example, a method in which when entering an idle stop mode a fuel cell may be maintained at the optimum conditions to enhance the durability of the fuel cell. However, although the control process for the idle stop function is differentiated from the control process for shutting down the fuel cell system, reduction in drivability of the vehicle still remains since the voltage and temperature of the stack are reduced when the fuel cell stops.

The foregoing is intended merely to aid in the understanding of the background of the present invention, and is not intended to mean that the present invention falls within the purview of the related art that is already known to those skilled in the art.

SUMMARY

Accordingly, the present invention provides a driving control method and system for a fuel cell vehicle which improves the drivability and durability of the fuel cell vehicle when the vehicle is operated in a minimum driving mode.

According to one aspect, a driving control method for a fuel cell vehicle may include: monitoring, by a vehicle controller, information regarding vehicle conditions; entering a minimum driving mode when the monitored vehicle conditions meet minimum-driving-mode entry conditions, and determining, by the vehicle controller, a temperature of a fuel cell stack; and adjusting, by the vehicle controller, the temperature of the fuel cell stack, when the determined temperature of the fuel cell stack is different from a preset target stack temperature value, to match the temperature of the fuel cell stack to the preset target stack temperature.

The temperature control operation may include: interrupting, by the vehicle controller, coolant flowing from a radiator to the fuel cell stack when the temperature of the fuel cell stack is less than the preset target stack temperature value. The temperature control operation may further include maintaining, by the vehicle controller, a revolutions per minute (RPM) of a cooling pump at a preset RPM value when the temperature of the fuel cell stack is less than the preset target stack temperature value and increasing, by the vehicle controller, the RPM of a cooling pump when the temperature of the fuel cell stack is greater than the preset target stack temperature value.

The driving control method may further include, after the temperature control operation, maintaining, by the vehicle controller, a voltage of the fuel cell stack at a preset stack voltage value; maintaining, by the vehicle controller, an RPM of an air blower at a preset air blower RPM value; or maintaining, by the vehicle controller, a flow rate at an outlet of an air blower at a preset flow rate value. The minimum-driving-mode entry conditions may include conditions in which a required vehicle torque is less than a preset required entry torque value and a state of charge (SOC) of a battery exceeds a preset entry SOC value.

The driving control method may further include, after the temperature control operation: releasing, by the vehicle controller, the minimum driving mode when the monitored vehicle conditions meet minimum-driving-mode release conditions and monitoring a minimum cell voltage of the fuel cell stack for a preset release time; maintaining, by the vehicle controller, an RPM of an air blower at a preset air blower RPM value for a preset maintenance time when the monitored minimum cell voltage is less than a preset minimum cell voltage value; and restarting, by the vehicle controller, a fuel cell after the preset maintenance time has elapsed. The driving control method may further include, after the cell voltage monitoring operation, restarting, by the vehicle controller, the fuel cell when the monitored minimum cell voltage is the preset minimum cell voltage value or greater. The minimum-driving-mode release conditions may include a condition in which a required vehicle torque is greater than a preset required release torque value, or a condition in which a SOC of a battery is less than a preset release SOC value.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
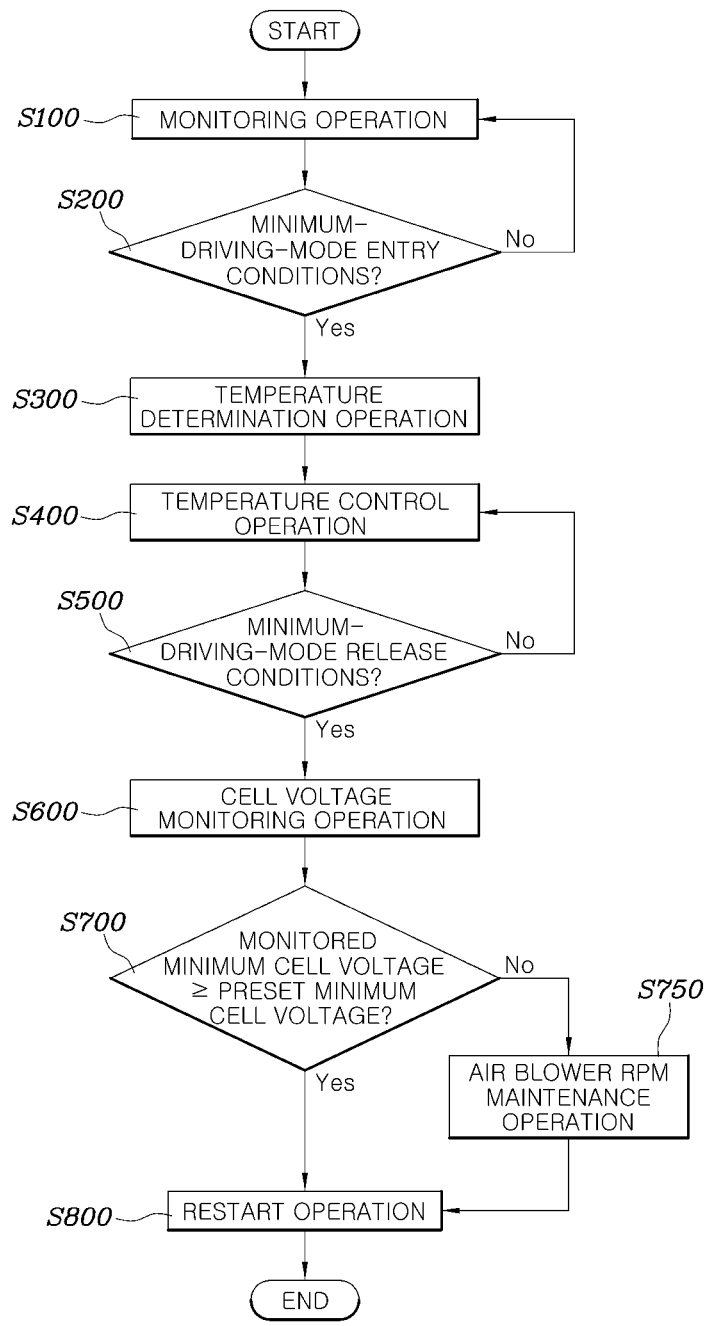
FIG. 1 is a flowchart of a driving control method for a fuel cell vehicle according to an exemplary embodiment of the present invention.
Figure 2:
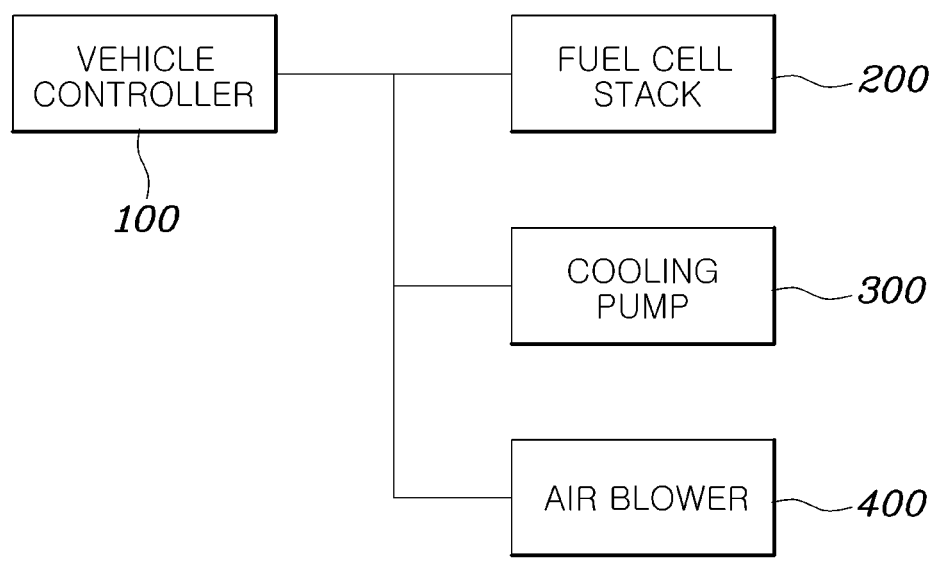
FIG. 2 is a block diagram of a driving control system for a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described with reference to the attached drawings. The method described herein below may be executed by a controller having a processor and a memory.

As shown in FIG. 1, a driving control method for a fuel cell vehicle according to the present invention may include: monitoring, by a vehicle controller 100, information regarding vehicle conditions (S100); entering a minimum driving mode when the monitored vehicle conditions meet minimum-driving-mode entry conditions, and determining, by the vehicle controller 100, the temperature of a fuel cell stack 200 (S300); and adjusting, by the vehicle controller 100, the temperature of the fuel cell stack 200 when the determined temperature of the fuel cell stack 200 is different from a preset target stack temperature value, and thus matching the temperature of the fuel cell stack 200 with the preset target stack temperature (e.g., adjusting the temperatures to correspond to each other) (S400).

In the monitoring operation S100, the controller may be configured to monitor overall conditions of the vehicle. Generally, the overall conditions include significant main factors pertaining to the operation of the fuel cell vehicle. For example, the overall conditions may include the temperature of coolant for the fuel cell, the voltage of the fuel cell stack 200, an SOC (state of charge) of a battery, a required vehicle torque, a flow rate and an RPM of an air blower 400, etc.

In the present embodiment, an operation 5200 may be performed of determining, by the vehicle controller 100, whether the vehicle conditions meet or satisfy the minimum-driving-mode entry conditions using the information regarding the vehicle conditions by the monitoring operation S100. The minimum driving mode has the same purpose as that of an idle stop or fuel cell ( ) stop mode, which is a term that is ordinarily used in the field pertaining to fuel cell vehicles. In other words, fuel cell vehicles have the minimum driving mode aiming to increase the fuel efficiency of a vehicle in a low power section while moving in a normal driving mode. The difference between the minimum driving mode and the idle stop mode is that the minimum driving mode does not completely stop the generation of the fuel cell unlike the idle stop mode.

In several aspects, the minimum driving mode is distinguished from the idle stop mode. One of these aspects refers to entry conditions used in determining whether the vehicle may enter the minimum driving mode. The entry conditions may be set in various ways based on the conditions or type of vehicle. In the present exemplary embodiment, as one example of such various ways, conditions in which a required vehicle torque is less than a preset required entry torque value and the SOC of the battery exceeds a preset entry SOC value are proposed as the minimum-driving-mode entry conditions.

The required vehicle torque may also be regarded as vehicle power desired by a driver. Therefore, the words "the required vehicle torque is substantial" may indicate that the vehicle requires substantial power (e.g., greater than a predetermined power) since the driver intends to accelerate the vehicle. Thus, in this case, the vehicle must not enter the minimum driving mode. Accordingly, in the present invention, the case when the required vehicle torque is less than the preset required entry torque value may be set as being the minimum-driving-mode entry conditions.

The required entry torque value may be preset as various values. Although the required entry torque value may be changed into various values based on the type of vehicle, it may also be changed into various values based on the driving propensity (e.g., tendency) of the driver. For a driver who has aggressive driving habits such as rapid acceleration, the required entry torque value may be set to a comparatively low value. For a driver who has gentle driving habits such as smooth driving, the required entry torque value may be set to a comparatively high value.

In the present invention, the SOC of the battery, as well as the above-mentioned required vehicle torque, may be regarded as being one of the minimum-driving-mode entry conditions. For example, when the SOC of the battery is reduced, a degradation phenomenon may occur, whereby the durability of the battery may be reduced. Accordingly, the SOC of the battery should be maintained at an appropriate level. Therefore, the present embodiment may be set such that when the SOC of the battery exceeds the preset entry SOC value may the vehicle enter the minimum driving mode. Although a reference value relative to the entry SOC value may be changed based on the type of battery, the reference value may range from about 70% to 80% of the entry SOC value.

As stated above, in the present invention, the required vehicle torque and the SOC of the battery may be used as the minimum-driving-mode entry conditions. In particular, the temperature of the fuel cell stack 200 may not be set as one of the minimum-driving-mode entry conditions.

In fuel cell vehicles, the temperature of coolant of a fuel cell is a factor of idle stop entry conditions since when the vehicle enters the idle stop mode, the power generation of the fuel cell is interrupted and thus, the temperature of the fuel cell stack 200 is continuously reduced. Furthermore, as the temperature of the fuel cell stack 200 is continuously reduced, water that remains in the fuel cell stack 200 freezes thus causing a flooding phenomenon. When flooding occurs, the durability of the fuel cell decreases as well as the efficiency of the fuel cell. Therefore, in the conventional technique, the idle stop entry conditions include conditions in which the temperature of the coolant of the fuel cell is a predetermined temperature or greater. As a result, in a cold driving mode or a cold start state in which the temperature of the fuel cell stack 200 is comparatively low, the vehicle is unable to enter the idle stop mode.

However, in the present invention, the temperature of the coolant of the fuel cell is excluded from factors required for meeting the minimum-driving-mode entry conditions. To solve the problem of a flooding which may be caused by the exclusion of the temperature of the coolant from the factors, the temperature of the fuel cell stack 200 may be adjusted in the minimum driving mode to allow the fuel cell vehicle to enter the minimum driving mode even in the cold driving mode or the cold start state.

Accordingly, in the exemplary embodiment of the present invention, as shown in FIG. 1, to adjust the temperature of the fuel cell stack 200, the vehicle controller 100 may be configured to determine the temperature of the fuel cell stack 200 (S300). In the temperature control operation S400, when the determined temperature of the fuel cell stack 200 is different from the preset target stack temperature value, the vehicle controller 100 may be configured to adjust the temperature of the fuel cell stack 200 to match (e.g., correspond) the temperature of the fuel cell stack 200 with the preset target stack temperature. The temperature of the fuel cell stack 200 may be determined in various ways. One common method is a method in which a temperature sensor disposed on a coolant passage detects the temperature of coolant of the fuel cell stack 200 and then the temperature of the fuel cell stack 200 is determined based on such a reading.

Although the target stack temperature value may be set to various values based on the vehicle conditions or the driving propensity of the driver, the target stack temperature value must be a temperature value at which the flooding of the fuel cell stack 200 may be prevented, as described above. Generally, since the freezing point of water is 0° C. under atmospheric pressure, the target stack temperature value may be set to be less than about 5° C., taking a margin value into account.

When the temperature of the fuel cell stack 200 has been determined, the vehicle controller 100 may be configured to compare the determined temperature with the preset target stack temperature value and compensate for a difference value determined between the two temperatures. Various methods may be used as the method of adjusting the temperature of the stack. Particularly, based on whether the temperature of the stack is greater than or less than the target stack temperature value, different control methods may be used. In the present invention, three representative examples are introduced as the temperature control method.

A first method is a control method which pertains to the case where the temperature of the fuel cell stack 200 is less than the preset target stack temperature value, and in which the vehicle controller 100 interrupts the flow of coolant from a radiator to the stack. Generally, the radiator for fuel cell vehicles and the fuel cell stack 200 may be connected by a three-way valve. Coolant which is cooled by the radiator may be supplied to the fuel cell stack 200 through a connection passage with the three-way valve, thus functioning to reduce the temperature of the stack. Therefore, when the flow of the coolant is interrupted, the flow rate of coolant passing through the stack may be reduced causing the temperature of the fuel cell stack 200 to increase.

A second method is also a control method pertaining to the case where the temperature of the fuel cell stack 200 is less than the preset target stack temperature value. In this control method, the vehicle controller 100 may be configured to maintain the RPM of a cooling pump 300 at a preset PRM value. The stack of the fuel cell vehicle may be cooled by coolant supplied by a separate cooling pump 300, as well as being cooled by coolant cooled by the radiator. Therefore, the present invention may include an operation of adjusting the RPM of the cooling pump 300 to increase the temperature of the stack when the temperature of the stack is less than the preset target stack temperature value. Although the preset RPM value may be set to various values based on the performance of the stack, the preset RPM may be less than a normal RPM value of the cooling pump 300 since it is used in the control method for increasing the temperature of the stack.

Lastly, a third method pertains to the case where the temperature of the fuel cell stack 200 is greater than the preset target stack temperature value, unlike the above-mentioned two types of methods. For this case, the present invention proposes a method in which the vehicle controller 100 increases the RPM of the cooling pump 300. The third method reversely conducts the operation of the second method. In other words, in the third method, to reduce the temperature of the fuel cell stack 200, the RPM of the cooling pump 300 may be increased and thus the flow rate of coolant supplied to the fuel cell stack 200 may be increased. Therefore, in this case, since the flow rate of coolant passing through the fuel cell stack 200 is increased, the temperature of the fuel cell stack 200 may be consequently reduced.

As described above, the minimum driving mode is a mode distinguished from the idle stop mode. A method of controlling the fuel cell vehicle in the minimum driving mode is also different from that in the idle stop mode. Therefore, the present invention proposes various control methods to enhance the drivability in the minimum driving mode as well as the method of controlling the temperature of the fuel cell stack 200.

One of the various control methods is a method in which the vehicle controller 100 may be configured to maintain the voltage of the fuel cell stack 200 at a preset stack pressure value. Generally, in the idle stop mode, since the generation of the fuel cell is interrupted, the voltage of the stack may be reduced to about 0 V as time elapses. Therefore, when the idle stop mode is released and the stack restarts, the fuel cell requires high output power. Thus, when the vehicle rapidly accelerates, unfamiliarity in driving may occur, and the drivability may be reduced.

Accordingly, the present invention proposes a method of maintaining the voltage of the stack at a preset stack pressure value. The stack voltage value may be set to various values based on the vehicle conditions and the driving propensity of the driver. However, when the stack voltage value is set to an excessively high value, it is inefficient in terms of durability although the drivability may be enhanced. In contrast, when the stack voltage value is set to an excessively low value, the durability may be enhanced, but it is inefficient in terms of drivability and fuel efficiency. Accordingly, the stack voltage value must be set to the optimum value.

In addition, a method in which the vehicle controller 100 may be configured to maintain the RPM of the air blower 400 at a preset air blower 400 RPM value which may be taken into account similarly as the method in which the stack voltage value is maintained substantially constant. Since the voltage of the fuel cell stack 200 is maintained substantially constant rather than dropping to 0 V, the generation of the fuel cell is not completely stopped. Therefore, in consideration of the generation of the fuel cell, the air blower 400 which supplies oxygen to the fuel cell stack 200 may be operated. Accordingly, in the present invention, the method of maintaining the RPM of the air blower 400 at the preset air blower 400 RPM value is proposed.

Although the RPM of the air blower 400 may be determined by various methods, one method may include using map data from which a stack voltage value may be determined as an output value using the RPM of the air blower 400 as an input value. Similarly, a method of controlling the amount of oxygen supplied to the fuel cell stack 200 includes maintaining a flow rate at an outlet of the air blower 400 at a preset flow rate value. This method has the same purpose as that of the method of controlling the RPM of the air blower 400 in that the amount of oxygen may be adjusted. However, the control method using the RPM of the air blower 400 is a method by which the amount of oxygen supplied to the fuel cell stack 200 may be indirectly determined. On the other hand, the control method using the flow rate of air at the outlet of the air blower 400 is a method by which the amount of oxygen may be directly determined. Accordingly, the control method using the flow rate may be more efficient in terms of accuracy.

The preset flow rate of the air blower 400 in the control method using the flow rate of air may be set to various values. In particular, use of mass flow rate as the flow rate of the air blower 400 is more adapted for the object of the present invention, rather than use of volume flow rate since oxygen is a gas and thus the volume flow rate varies substantially based on the pressure. Therefore, when a flow rate value is measured, a mass flow rate value is typically used for gas while a volume flow rate value is used for liquid. Therefore, in the present invention, a mass flow rate value may be used to measure the flow rate of the air blower 400.

According to the above-described method, while the minimum driving mode is maintained, the vehicle conditions monitored by the vehicle controller 100 may meet minimum-driving-mode release conditions. The minimum-driving-mode release conditions may be set in various ways similar to that of the above-described minimum-driving-mode entry conditions. In the present invention, two conditions are proposed as the minimum-driving-mode release conditions in response to the minimum-driving-mode entry conditions.

One of the conditions includes a required vehicle torque exceeding a preset required release torque value to meet the minimum-driving-mode release conditions. The required vehicle torque desired by the driver may not be embodied in the minimum-driving-mode. In particular, the minimum driving mode of the vehicle may be automatically released. The preset required release torque value may be set to various values based on the type of vehicle and the driving propensity of the driver in the same manner as that of the above-described required entry torque value. The other condition is a condition in which the SOC of the battery is less than a preset release SOC value. In particular, the minimum driving mode may be released since the battery must be charged to prevent degradation of the battery. Although the preset release SOC value may also be set to various values based on the type of battery in the same manner as that of the entry SOC value, generally the SOC may range from about 15% to 25%.

When the conditions of the vehicle monitored using the above-mentioned minimum-driving-mode release conditions S500 meet the minimum-driving-mode release conditions, as shown in FIG. 1, the following steps may be performed: releasing, by the vehicle controller 100, the minimum driving mode and monitoring the minimum cell voltage of the fuel cell stack 200 for a preset release time (S600); and determining, by the vehicle controller 100, whether the monitored minimum cell voltage is a preset minimum cell voltage value or greater (S700).

The term "minimum cell voltage" refers to the minimum voltage of cells that forms the fuel cell stack 200. During the minimum driving mode, the voltage of the stack may be less than that of the normal driving mode. Therefore, the minimum cell voltage may also be less than that of the normal driving mode. Furthermore, when the minimum cell voltage is decreased to below a predetermined reference, a flooding phenomenon may occur in the stack. Therefore, to prevent such a flooding phenomenon, the driving control method may further include comparing the minimum cell voltage with the preset minimum cell voltage value. Particularly, the preset minimum cell voltage value may also be set to various values based on the type of fuel cell stack 200 and circumstances.

When the minimum cell voltage monitored in the comparison operation S700 is less than the preset minimum cell voltage value, as shown in FIG. 1, the following operations may be performed: maintaining, by the vehicle controller 100, the RPM of the air blower 400 at the preset air blower 400 RPM value for a preset maintenance time (S750); and restarting, by the vehicle controller 100, the fuel cell after the preset maintenance time has elapsed (S800). When the minimum cell voltage is less than the preset minimum cell voltage value, a flooding phenomenon caused in the fuel cell stack 200 may be prevented by maintaining the air blower 400 RPM before the fuel cell restarts.

The operation of the air blower 400 may include supplying oxygen to the fuel cell stack 200. Thus, the stack generates electricity and thus the temperature of the stack increases, causing water remaining in the stack to evaporate. Thereby, the flooding phenomenon may be prevented. In particular, the preset air blower 400 RPM value and the preset maintenance time value may be set to various values. However, the RPM value and the maintenance time are in inverse proportion to each other, wherein when the RPM value is increased, the maintenance time is reduced, and when the RPM value is reduced, the maintenance time is increased. Therefore, the RPM value and the maintenance time of the air blower 400 may be set to appropriate values, taking advantages and disadvantages of these two conditions into account.

Meanwhile, as shown in FIG. 1, when the minimum cell voltage monitored in the comparison operation S700 is the preset minimum cell voltage value or greater, the fuel cell may be restarted by the vehicle controller 100. In particular, unlike described above, a separate operation to prevent a flooding phenomenon of the fuel cell stack 200 may be omitted. Consequently, the restart operation S800 of releasing the minimum driving mode and conducting the normal driving mode may be directly performed.

As described above, according to the present invention, the following effects may be obtained.

First, the temperature and voltage of a stack may be maintained substantially constant in a minimum driving mode, whereby low-temperature performance and drivability of a fuel cell vehicle may be enhanced.

Second, minimum-driving-mode entry conditions do not include a factor pertaining to the temperature of coolant of a fuel cell stack 200, and the temperature of the stack may be adjusted in the minimum driving mode. Therefore, even when the fuel cell vehicle is in a cold state, the vehicle may enter the minimum driving mode.

Third, the vehicle may enter the minimum driving mode even in a cold state. Therefore, the present invention may prevent deterioration in the durability of the fuel cell which may be caused when the fuel cell is retained in a high-potential state.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A driving control method for a fuel cell vehicle, comprising:
   monitoring, by a vehicle controller, information regarding vehicle conditions;
   entering, by the vehicle controller, a minimum driving mode when the monitored vehicle conditions meet minimum-driving-mode entry conditions, and determining, by the vehicle controller, a temperature of a fuel cell stack; and
   adjusting, by the vehicle controller, the temperature of the fuel cell stack, when the determined temperature of the fuel cell stack is different from a preset target stack temperature value, to match the temperature of the fuel cell stack with the preset target stack temperature.

2. The driving control method according to claim 1, wherein the temperature adjustment includes:
   interrupting, by the vehicle controller, coolant flowing from a radiator to the fuel cell stack when the temperature of the fuel cell stack is less than the preset target stack temperature value.

3. The driving control method according to claim 1, wherein the temperature adjustment includes:
   maintaining, by the vehicle controller, a revolutions per minute (RPM) of a cooling pump at a preset RPM value when the temperature of the fuel cell stack is less than the preset target stack temperature value.

4. The driving control method according to claim 1, wherein the temperature adjustment includes:
   increasing, by the vehicle controller, a revolutions per minute (RPM) of a cooling pump when the temperature of the fuel cell stack is greater than the preset target stack temperature value.

5. The driving control method according to claim 1, further comprising:
   maintaining, by the vehicle controller, a voltage of the fuel cell stack at a preset stack voltage value after adjusting the temperature of the fuel cell stack.

6. The driving control method according to claim 1, further comprising:
   maintaining, by the vehicle controller, a revolutions per minute (RPM) of an air blower at a preset air blower RPM value after adjusting the temperature of the fuel cell stack.

7. The driving control method according to claim 1, further comprising:
   maintaining, by the vehicle controller, a flow rate on an outlet of an air blower at a preset flow rate value after adjusting the temperature of the fuel cell stack.

8. The driving control method according to claim 1, wherein the minimum-driving-mode entry conditions comprise conditions in which a required vehicle torque is less than a preset required entry torque value and a state of charge (SOC) of a battery exceeds a preset entry SOC value.

9. The driving control method according to claim 1, further comprising:
   releasing, by the vehicle controller, the minimum driving mode when the monitored vehicle conditions meet minimum-driving-mode release conditions and monitoring, by the vehicle controller, a minimum cell voltage of the fuel cell stack for a preset release time;
   maintaining, by the vehicle controller, a revolutions per minute (RPM) of an air blower at a preset air blower RPM value for a preset maintenance time when the monitored minimum cell voltage is less than a preset minimum cell voltage value; and
   restarting, by the vehicle controller, a fuel cell after the preset maintenance time has elapsed.

10. The driving control method according to claim 9, further comprising:
    restarting, by the vehicle controller, the fuel cell when the monitored minimum cell voltage is the preset minimum cell voltage value or more.

11. The driving control method according to claim 9, wherein the minimum-driving-mode release conditions comprise a condition in which a required vehicle torque is greater than a preset required release torque value.

12. The driving control method according to claim 9, wherein the minimum-driving-mode release conditions comprise a condition in which a SOC (state of charge) of a battery is less than a preset release SOC value.

13. A driving control system for a fuel cell vehicle, comprising:
    a memory configured to store program instructions; and
    a processor configured to execute the program instructions, the program instructions when executed configured to:
      monitor information regarding vehicle conditions;
      enter a minimum driving mode when the monitored vehicle conditions meet minimum-driving-mode entry conditions, and determining, by the vehicle controller, a temperature of a fuel cell stack; and
      adjust the temperature of the fuel cell stack, when the determined temperature of the fuel cell stack is different from a preset target stack temperature value, to match the temperature of the fuel cell stack with the preset target stack temperature.

14. The driving control system according to claim 13, wherein the program instructions for temperature adjustment when executed are further configured to:
interrupt coolant flowing from a radiator to the fuel cell stack when the temperature of the fuel cell stack is less than the preset target stack temperature value.

15. The driving control system according to claim 13, wherein the program instructions for temperature adjustment when executed are further configured to:
maintain a revolutions per minute (RPM) of a cooling pump at a preset RPM value when the temperature of the fuel cell stack is less than the preset target stack temperature value.

16. The driving control system according to claim 13, wherein the program instructions for temperature adjustment when executed are further configured to:
increase a revolutions per minute (RPM) of a cooling pump when the temperature of the fuel cell stack is greater than the preset target stack temperature value.

17. The driving control system according to claim 13, wherein the program instructions when executed are further configured to:
maintain a voltage of the fuel cell stack at a preset stack voltage value after adjusting the temperature of the fuel cell stack.

18. The driving control system according to claim 13, wherein the program instructions when executed are further configured to:
maintain a revolutions per minute (RPM) of an air blower at a preset air blower RPM value after adjusting the temperature of the fuel cell stack.

19. The driving control system according to claim 13, wherein the program instructions when executed are further configured to:
maintain a flow rate on an outlet of an air blower at a preset flow rate value after adjusting the temperature of the fuel cell stack.

20. The driving control system according to claim 13, wherein the program instructions when executed are further configured to:
release the minimum driving mode when the monitored vehicle conditions meet minimum-driving-mode release conditions and monitoring, by the vehicle controller, a minimum cell voltage of the fuel cell stack for a preset release time;
maintain a revolutions per minute (RPM) of an air blower at a preset air blower RPM value for a preset maintenance time when the monitored minimum cell voltage is less than a preset minimum cell voltage value; and
restart a fuel cell after the preset maintenance time has elapsed.

* * * * *